United States Patent
Haul et al.

(10) Patent No.: US 6,210,080 B1
(45) Date of Patent: Apr. 3, 2001

(54) PNEUMATIC TRANSPORT AND CONTROL DEVICE FOR TRANSPORTING FILTER ROD SECTIONS

(75) Inventors: Michael Haul, Hamburg; Martin Paech, Tespe, both of (DE)

(73) Assignee: Hauni Maschinenbau AG, Hamburg (DE)

( * ) Notice: Subject to any disclaimer, the term of this patent is extended or adjusted under 35 U.S.C. 154(b) by 0 days.

(21) Appl. No.: 09/151,731

(22) Filed: Sep. 11, 1998

(30) Foreign Application Priority Data

Sep. 12, 1997 (DE) .............................. 197 40 070

(51) Int. Cl.⁷ .................................................. B65G 51/34
(52) U.S. Cl. .................................. 406/13; 406/14; 406/84
(58) Field of Search .................................. 406/10, 12, 13, 406/14, 84, 192

(56) References Cited

U.S. PATENT DOCUMENTS

| | | |
|---|---|---|
| 3,974,007 | 8/1976 | Greve . |
| 4,178,662 | 12/1979 | Borodin . |
| 4,311,229 | 1/1982 | Bennett . |
| 4,469,111 | 9/1984 | Pinck et al. . |
| 4,551,040 | * 11/1985 | Kasparek et al. ...................... 406/10 |
| 4,710,066 | 12/1987 | Kägeler et al. . |
| 5,135,008 | 8/1992 | Oesterling et al. . |

FOREIGN PATENT DOCUMENTS

| | | |
|---|---|---|
| 2 306 096 | 8/1974 | (DE) . |
| 0 262 236 | 9/1986 | (EP) . |
| 233029 | * 2/1990 | (JP) ....................................... 406/84 |

* cited by examiner

Primary Examiner—Christopher P. Ellis
Assistant Examiner—Joe Dillon, Jr.
(74) Attorney, Agent, or Firm—Venable; George H. Spencer; Catherine M. Voorhees

(57) ABSTRACT

Apparatus for transporting a file of successive filter rod sections lengthwise from a sender (such as a filter rod making machine) to a remote receiver (such as the magazine of a filter tipping machine) has an elongated pneumatic conduit with a section-receiving end at the sender and a section-discharging end at the receiver. The speed of lengthwise movement of sections in the conduit is monitored by a sensor which generates signals serving to control the operation of a valve which can influence the speed of the articles by varying the effective size of an outlet for the escape of air from the conduit, and/or to control the operation of a valve serving to admit into the conduit air counter to the direction of advancement of the sections. The purpose of evacuation of appropriate quantities of air from, or of admission of selected quantities of air into, the conduit is to maintain the speed of the sections in the conduit within a desired range regardless of the number of sections in the conduit.

20 Claims, 2 Drawing Sheets

PNEUMATIC TRANSPORT AND CONTROL DEVICE FOR TRANSPORTING FILTER ROD SECTIONS

CROSS-REFERENCE TO RELATED CASE

This application claims the priority of German patent application Ser. No. 197 40 070.1 filed Sep. 12, 1997. The disclosure of the German patent application, as well as of each patent mentioned in the specification of the present application, is incorporated herein by reference.

BACKGROUND OF THE INVENTION

The invention relates to improvements in an apparatus for pneumatically transporting a file or row of successive rod-shaped articles lengthwise between a sender and a receiver. More particularly, the invention relates to improvements in an apparatus which can be utilized with advantage for pneumatic transport of rod-shaped articles of the tobacco processing industry, especially for pneumatic transport of filter rod sections of unit length or multiple unit length. For example, the pneumatic transport according to the invention can move filter rod sections from a filter rod making machine to the magazine of a so-called tipping machine wherein the filter rod sections are united with rod-shaped tobacco-containing articles to form filter cigarettes, cigars, cigarillos or the like. As a rule, the filter rod sections or articles which reach the receiver are caused to move sideways, e.g., into the aforementioned magazine of the tipping machine.

As a rule, a pneumatic conveyor for a file of successive rod-shaped articles (hereinafter mainly referred to as sections or filter rod sections) comprises an elongated pneumatic conduit defining an elongated path (such path can include straight as well as arcuate portions) for successive sections of the file. The conduit has a receiving end which accepts successive sections from the sender, and a discharge end which delivers successive sections to the receiver. As a rule, the conduit receives and advances a file of successive sections which may but need not be of identical length, and the number of conveyed sections per unit of time may but need not be constant, depending on variations of output of the maker of filter rod sections and/or upon fluctuations of the requirements of the consumer of filter rod sections. It is desirable to ensure that the distance or spacing between successive sections in the pneumatic conduit remain at least substantially constant, i.e., within a certain acceptable range of distances. Actual conveying takes place by means of a pressurized fluid, normally compressed air, and the pressure of the fluid influences the achievement of or the failure to achieve the aforementioned desired parameters including the establishment of and adherence to an optimum distance between successive sections of the file of such sections in the conduit.

In the event of a malfunction, e.g., a malfunction involving fluctuations in the rate of transport which are attributable to the sender and normally involve a reduction of the rate of transport of sections per unit of time, a conventional apparatus is likely to develop undesirable changes in the rate and manner of receiving successive sections at the discharge end of the conduit; this can result in an undesirable interruption of the delivery of sections or in an equally undesirable pile-up of sections at the discharge end of the conduit.

OBJECTS OF THE INVENTION

An object of the invention is to provide an apparatus whose operation is more reliable and more predictable than that of heretofore known apparatus for the transport of filter rod sections or the like by means of a gaseous fluid.

Another object of the invention is to provide an apparatus which can be utilized in existing production lines, e.g., between a filter rod making machine and a tipping machine of a production line serving to turn out filter cigarettes, cigars, cigarillos or the like.

A further object of the invention is to provide the apparatus with novel and improved means for influencing the rate of advancement of successive filter rod sections of a file of such sections in a pneumatic conduit.

An additional object of the invention is to provide an apparatus whose operation is particularly desirable and advantageous when the rate of delivery of rod-shaped articles in the conduit tends to depart from an acceptable rate, e.g., when such rate tends to increase beyond the acceptable rate.

Still another object of the invention is to provide a novel and improved method of influencing the rate of advancement of a continuous file of successive rod-shaped articles of the tobacco processing industry in an elongated path which is defined by the conduit of a pneumatic conveyor.

A further object of the invention is to provide a production line, particularly for filter cigarettes, which embodies one or more pneumatic transporting apparatus of the above outlined character.

Another object of the invention is to provide novel and improved fluid flow and fluid pressure regulating devices for use in the above outlined transporting apparatus.

An additional object of the invention is to provide a novel and improved conduit for use in the above outlined apparatus.

Still another object of the invention is to provide the above outlined apparatus with a novel and improved device which can receive and manipulate successive rod-shaped articles (such as filter rod sections of unit length or multiple unit length) which are being delivered by the conduit.

A further object of the invention is to provide a pneumatic transporting apparatus for filter rod sections or the like whose operation is highly satisfactory regardless of the exact configuration of the conduit, e.g., whether or not the conduit includes an arcuate portion or section immediately upstream of the discharge end of the conduit.

Another object of the invention is to provide an apparatus which can treat the conveyed commodities gently during each and every stage of transport from a sender to a receiver and regardless of fluctuations in the rate of transport in the conduit.

SUMMARY OF THE INVENTION

The invention is embodied in an apparatus for transporting a file of successive rod-shaped articles (e.g., filter rod sections which are convertible into the mouthpieces of filter tipped smokers' products) lengthwise from a sender to a receiver. The apparatus comprises a pneumatic conduit which is arranged to advance the articles of the file at a plurality of speeds and includes an article-receiving end at the sender as well as an article-discharging end at the receiver, means for accepting articles from the receiver, means for monitoring the speed of articles in the conduit and for generating signals having characteristics denoting the monitored speed of the articles, and means for influencing the speed of articles in the conduit as a function of the characteristics of the signals.

The accepting means can include means for advancing successive articles of the file sideways away from the receiver.

The monitoring means (e.g., a system of sensors) can be located at the receiver.

The influencing means can be located upstream of the monitoring means, as seen a direction counter to the direction of conveying the articles from the article-receiving end toward the article-discharging end of the conduit.

The influencing means can be installed directly in the conduit, i.e., between the article-receiving and article-discharging ends of the conduit. For example, the influencing means (or at least a portion of the influencing means) can be integrated into the conduit.

It is often desirable or advantageous to install the influencing means (or at least a portion of the influencing means) at one of the article-receiving and article-discharging ends of the conduit.

The influencing means can comprise a valve which is installed in the conduit and has a fluid outlet with an effective size or area which is variable in response to signals from the monitoring means. The valve can constitute an automatic vent- or venting valve. The arrangement can be such that the conduit defines an elongated fluid-containing path for successive articles of the file and is provided with a fluid discharging opening communicating with the outlet of the valve; the valve includes means for varying the effective size of the outlet in response to signals from the monitoring means. The means for varying the effective size of the outlet can comprise a pneumatically operated cylinder-and-piston unit, and the piston of such unit can constitute a means for actually varying the effective size of the outlet of the valve.

The speeds of the aforementioned plurality of speeds can include a predetermined maximum acceptable speed; the influencing means can comprise means for introducing into the conduit a gaseous fluid (such as air) which is effective to reduce the speed of articles when the monitored speed reaches or exceeds the maximum acceptable speed. Such introducing means can include at least one valve which is arranged to admit into the conduit a gaseous fluid which flows in a direction from the article-discharging end toward the articles-receiving end of the conduit.

The conduit can be configured in such a way that it defines an elongated path including an arcuate portion which is adjacent the article-discharging end. The monitoring means and/or the influencing means can be disposed at such arcuate portion of the elongated path. The arrangement can be such that the monitoring and/or the influencing means (or at least a portion of the influencing means) is located upstream of the arcuate portion as seen in the direction of conveying articles from the article-receiving end toward the article-discharging end of the conduit.

The apparatus can further comprise means for braking successive articles of the file at the receiver; for example, such braking means can comprise article-engaging rollers which are located ahead of the receiver, as seen in the direction of conveying articles from the sender to the receiver. Such apparatus can further comprise means (e.g., in the form of a pair of driven wheels or the like) for accelerating successive braked articles to a predetermined speed ahead of the accepting means, e.g., to a speed which is best suited to introduce successive articles into the range of a conveyor forming part of the accepting means and serving to advance articles in a suitable array (e.g., in the form of a layer of parallel articles which move sideways) into a magazine or to another destination. The monitoring and the influencing means are located ahead of the braking and accelerating means, as seen in the direction of conveying the articles of the file from the sender to the receiver.

The novel features which are considered as characteristic of the invention are set forth in particular in the appended claims. The improved pneumatic conveying apparatus itself, however, both as to its construction and the mode of assembling and manipulating the same, together with additional important features and advantages thereof, will be best understood upon perusal of the following detailed description of certain presently preferred specific embodiments with reference to the accompanying drawings.

DESCRIPTION OF PREFERRED EMBODIMENTS

Figure 1:
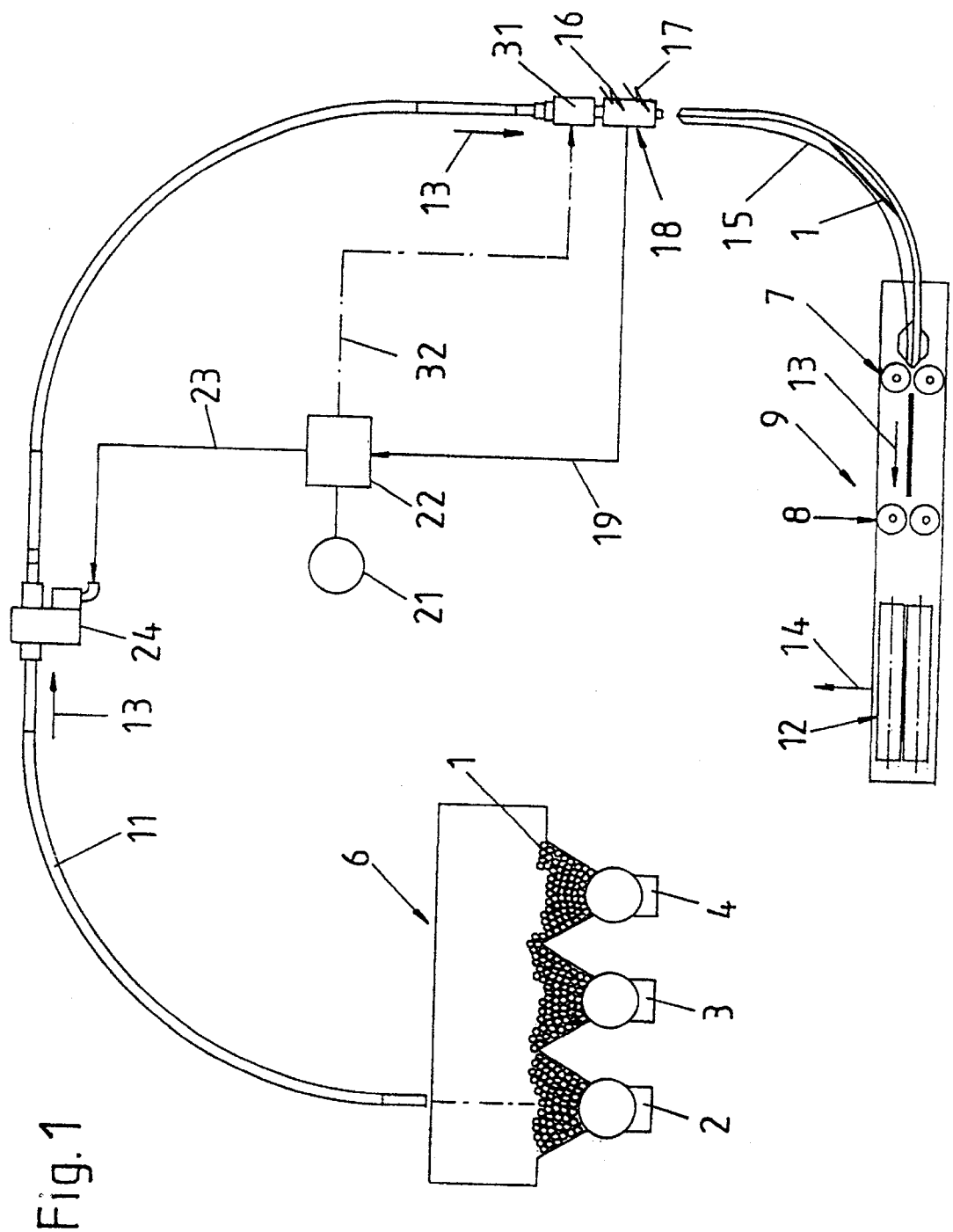
FIG. 1 is a schematic elevational view of an apparatus which connects one of three neighboring senders of rod-shaped articles with the corresponding receiver.

FIG. 1 shows a pneumatic transporting apparatus which comprises an elongated conduit 11 having an article-receiving end at one (2) of three neighboring senders 2, 3, 4 having receptacles for supplies of parallel rod-shaped articles 1 each of which is assumed to constitute a filter rod section of predetermined (unit or multiple unit) length. The discharge end of the conduit 11 is defined by an arcuate section or portion 15 which delivers successive articles 1 of a file of successive articles to a receiver 9. The illustrated arcuate portion 15 does (but need not) define approximately 25% of a circular path.

The articles in the elongated path within the conduit 11 advance lengthwise in a direction as indicated by the arrows 13, namely from a machine (e.g., a filter rod making machine) including the sender 2 to the machine (e.g., a filter tipping machine) including the receiver 9 or to a machine which obtains articles from the receiver, preferably by way of a direction changing device 12. The latter accepts successive articles 1 of the file from the receiver 9 and is preferably designed to transport the thus obtained articles sideways (see the arrow 14) and away from the receiver.

The senders 2, 3 and 4 are located at an article sending or discharging station 6, and each of these senders is or can be associated with a discrete conduit 11 for delivery of articles to a discrete receiver 9. The illustrated receiver 9 comprises singularizing means including an article braking device 7 followed by an article accelerating device 8. The braking device 7 has at least one pair of rollers or wheels which cooperate to engage and brake (decelerate) successive oncoming articles 1, and the accelerating device 8 also comprises one or more pairs of rollers or wheels which cooperate to accelerate successive freshly braked articles to a speed which is best suited for introduction of successive articles into the accepting or direction changing device 12 for sidewide movement to the next processing station, e.g., into the magazine of filter tipping machine, not shown.

The manner in which a sender (such as the sender 2 of FIG. 1) can admit successive articles into the receiving end of an elongated conduit (such as 11) is disclosed, for example, in commonly owned German patent No. 35 38 660 and in the corresponding U.S. Pat. No. 4,710,066 granted Dec. 1, 1987 to Peter Kägeler et al. for "METHOD AND APPARATUS FOR PNEUMATICALLY TRANSPORTING FILTER ROD SECTIONS AND THE LIKE". As already stated hereinbefore, the disclosures of all patents which are identified in this specification are incorporated herein by reference.

The apparatus of FIG. 1 further comprise a suitable monitoring device 18 having an output 19 for the transmission of signals having characteristics indicative of the speed of successive (or selected) articles 1 in the path defined by the adjacent portion of the conduit 11. The illustrated speed monitoring device 18 is located at (and more specifically immediately or closely upstream of) the arcuate portion or section 15 of the conduit 11 and comprise tow photocells 16, 17. It will be noted that the monitoring device 18 is nearer to the receiver 9 (i.e., to the article-discharging end of the conduit 11) than to the sender 2 at the article-receiving end of the conduit. The exact construction of the monitoring device 18 forms no part of the present invention. It is important that the monitoring device 18 employs a photo-electronic or other suitable device which can generate and transmit signals having characteristics indicative of the speed of successive (or alternating or selected) articles 1 in the adjacent portion or portions of the conduit 11.

The output 19 is or includes a suitable conductor (such as an electrical conductor) which transmits signals from the monitoring device 18 to a regulating valve 22 serving to control the admission of a pressurized fluid (such as compressed air) from a suitable source 21 into a conduit 23 and/or into a conduit 32 (the latter is indicated by dot-dash lines). The conduit 23 can admit compressed air into a pneumatic motor (cylinder and piston unit) which is shown in requisite detail in FIG. 2 and serves to control the effective cross-sectional area of an outlet 26 forming part of a vent valve or venting valve 24. The latter forms part of a composite article speed influencing unit which further includes a second valve or injector 31 (see particularly FIG. 3) arranged to receive compressed air from the regulating valve 22 via conduit 32.

The conduit 11 is or can be several hundred meters long, and the valve 24 of the article speed influencing unit is assumed to be located about fifteen meters upstream of the receiver 9. The illustrated valve 24 is integrated into the conduit 11; the latter has a circular opening 27 in the form of a short interruption or gap between the neighboring open ends of two adjacent conduit portions, and the opening 27 communicates with the outlet 26. The body or housing of the valve 24 surrounds the opening 27. The rate at which air can escape from the path for the articles 1 in the conduit 11 depends on the detected speed of the articles 1 in the range of the monitoring device 18. A spring 29 is provided in the body of the valve 24 to bias the piston 28 of the aforementioned pneumatic motor to a retracted position, i.e., to increase the rate of air escape from the conduit 11 via opening 27 and outlet 26. The bias of the spring 29 is opposed by compressed air which is supplied by the regulating valve 22 via conduit 23 and acts upon the adjacent end face of the piston 28. The valve 24 is actually a throttle valve which can select the rate at which the piston 28 impedes the flow of air from the conduit 11 via opening 27 and outlet 26.

As a rule, the conduit 11 will deliver a file of successive articles 1 of predetermined length which are transported long-term at a constant rate (i.e., predetermined numbers of articles per unit of time). This is achieved by admitting into the article-receiving end of the conduit 11 compressed air at a selected pressure and at a selected rate. The pressure and rate of admission of compressed air are selected in such a way that one ensures predictable and satisfactory pneumatic transport of successive articles 1 not only in straight portions of the conduit 11 but also in the arcuate portion 15, the singularizing means including the braking device 7 and the accelerating device 8 and even the article accepting or direction changing device 12.

However, it can happen that the operation of the apparatus is disturbed, for example, in that the output of articles 1 at the station 6 is reduced or in that the magazine of the sender 2 is empty. The number of articles 1 in the conduit 11 is then reduced accordingly and the propelling force of compressed air upon the articles 1 remaining (i.e., advancing) in the conduit 11 increases accordingly. In other words, the speed of the articles still advancing in the conduit 11 increases, and this is detected by the photocell 16 and/or 17 of the monitoring device 18 so that the output 19 transmits signals having characteristics which denote an increased speed of the articles in the path toward the receiver 9.

Excessive speed of articles in the conduit 11 is undesirable on several grounds; for example, the articles tend to pile up and clog the arcuate portion 15 of the conduit 11 if their speed exceeds a certain threshold value. In the event of a pileup, the braking device 7 fails to receive any articles or receives fewer articles than warranted by the rate of admission of articles into the conduit 11. The accelerating device 8 is ineffective as soon as the braking device 7 fails to deliver articles, and the tipping machine which is located downstream of or includes the article accepting or direction changing device 12 fails to receive articles at the required rate or receives no articles at all.

If the output 19 begins to transmit signals having characteristics indicating that the speed of articles 1 advancing past the monitoring device 18 is too high, the condition of the regulating valve 22 is changed accordingly, namely the rate of flow of compressed air from the source 21 via valve 22 and conduit 23 against the end face of the piston 28 is reduced and the spring 29 is free to retract the piston to a position in which the rate of outflow of air from the conduit 11 via opening 27 and outlet 26 increases (see arrows in FIG. 1). This entails a reduction of the speed of articles 1 in the conduit 11 with attendant reduction of the likelihood of clogging of the arcuate portion 15 and unsatisfactory operation of the constituents 7, 8 of the singularizing means and/or the device 12 at the receiver 9.

The valve 24 can be utilized jointly with, or it can replace, or it can be replaced by, the aforementioned injector valve 31 which is also incorporated into the conduit 11. As shown in FIG. 1, the injector 31 can be installed immediately upstream of the speed monitoring device 18, and its body is provided with one or more (FIG. 3 specifically shows two) suitably inclined channels serving to convey jets 34 of compressed air from the conduit 32 (in response to appropriate adjustment of the regulating valve 22 by signals from the monitoring device). The jets 34 of compressed air flowing in the channel(s) of the injector 31 enter the conduit 11 at 33 and flow counter to the direction of advancement of articles 1 toward the receiver 9, i.e., counter to the direction indicated by the arrows 13. This, too, entails a slowing-down of the articles 1 on their way to the braking device 7 and reduces the likelihood of a pileup in the arcuate portion 15 when the monitored speed of the articles reaches or exceeds a predetermined maximum permissible or acceptable speed.

The channel or channels for the jets 34 of compressed air in the housing or body of the injector 31 can form part of a circumferentially complete or nearly complete annular orifice which resembles the frustum of a hollow cone and directs compressed air (if any) from the conduit 32 into the adjacent portion 33 of the conduit 11 to flow counter to the direction indicated by the arrows 13.

It will be seen that the speed-reducing effect of the jets 34 of pressurized fluid entering the portion 33 of the conduit 11 via injector 31 is identical with or clearly equivalent to the effect of the valve 24, i.e., to an increase of the rate of escape of air which is admitted at the sender 2 and serves to propel articles 1 in the conduit 11 toward the receiver 9. Thus, either of these two constituents of the speed influencing means can enhance the reliability of the article conveying apparatus by becoming effective as soon as the detected speed of articles 1 in the conduit 11 reaches or exceeds a maximum permissible or acceptable value.

The regulating action of the valve 22 can be readily selected in such a way that the fluctuations of the speed of pneumatically conveyed rod-shaped articles are prevented, or reduced in duration or lessened to an extent which is necessary to avoid pileups and other undesirable phenomena which would necessitate a reduction of the output or a completed shutdown of the machine or machines receiving articles from the accepting or direction changing device 12.

An advantage of an influencing device (such as the injector 31) which is located immediately upstream of the monitoring device 18 (and particularly upstream of the arcuate portion 15 of the conduit 11) is that a corrective undertaking can be carried out immediately upstream of he locus of detection of undesirable speed and ahead of the locus (15) which is most likely to be clogged by a pileup of articles being delivered thereto at an unsatisfactory (excessive) speed.

Figure 2:
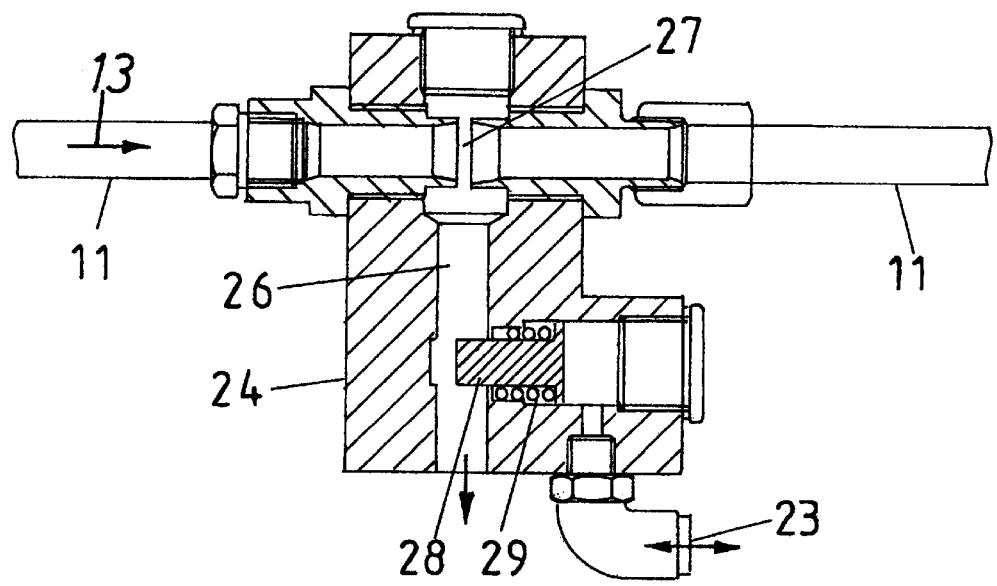
FIG. 2 is an enlarged sectional view of a first valve which can form part of or can constitute the influencing means in the apparatus of FIG. 1.

An important advantage of the valve 24 is that it can ensure gentle treatment during deceleration of articles as a result of an appropriate shifting of the piston 28, either under the bias of the spring 29 or in response to the application of fluid pressure, or an increased fluid pressure, against the right-hand end face of the piston (as viewed in FIG. 2).

Figure 3:
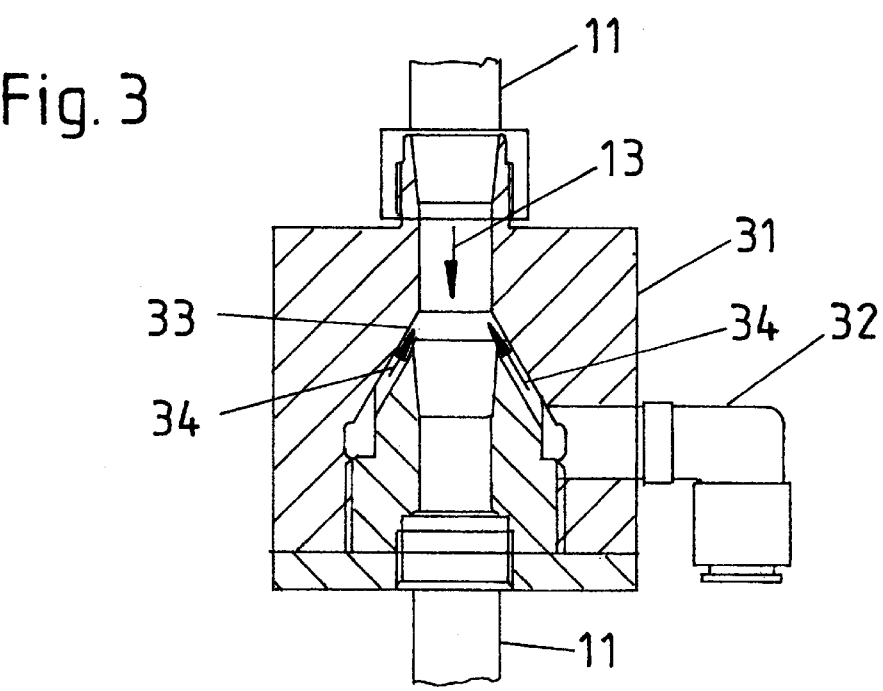
FIG. 3 is an enlarged sectional view of a second valve which constitutes an injector and can be used as that part of the influencing means which is to inject pressurized gaseous fluid into the conduit counter to the direction of advancement of articles in the conduit.

It will be readily appreciated that each of the (non-illustrated) conduits which serve to convey articles 1 from the senders 3, 4 to the respective receiver or receivers can also cooperate with and/or embody a structure (such as regulating valves, speed monitoring means and speed influencing means) identical with or analogous to that which has been described with reference to the apparatus embodying the illustrated conduit 11 and the influencing means of FIG. 2 and/or FIG. 3.

A filter rod making machine which embodies or is combined with at least one of the senders 2, 3 and 4 is described and shown, for example, in U.S. Pat. No. 3,974,007 granted Aug. 10, 1976 to Greve for "METHOD AND APPARATUS FOR THE PRODUCTION OF FILTER ROD SECTIONS OR THE LIKE". Filter tipping machines which can receive filter rod sections from the article accepting device 12 of FIG. 1 are disclosed, for example, in commonly owned U.S. Pat. No. 4,469,111 granted Sep. 4, 1984 to Pinck et al. for "APPARATUS FOR PERFORATING WEBS OF WRAPPING MATERIAL FOR TOBACCO OR THE LIKE", and in commonly owned U.S. Pat. No. 5,135,008 granted Aug. 4, 1992 to Oesterling et al. for "METHOD OF AND APPARATUS FOR MAKING FILTER CIGARETTES". The disclosures of the just enumerated U.S. patents are also incorporated herein by reference.

The valve 22 may, for example, by a Model MFH-2-M52/2 valve made by Festo Company, Germany, and the monitoring device 18 may, for example, by a Model BDAM 8S1 digital indicator made by Deuta Company, Germany.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of the above outlined contribution to the art of transporting rod-shaped articles and, therefore, such adaptations should and are intended to be comprehended within the meaning and range of equivalence of the appended claims.

What is claimed is:

1. An apparatus for transporting a file of successive rod-shaped articles lengthwise from a sender to a receiver, comprising:

a pneumatic conduit for receiving the articles of the file, said pneumatic conduit having an article-receiving end at said sender and an article-discharging end at said receiver;

means for advancing the articles of the file lengthwise through said pneumatic conduit from said sender to said receiver, said advancing means being able to move the articles of the file in a plurality of speeds;

means for accepting articles from said receiver;

means for monitoring the speed of the articles in said conduit and for generating signals having characteristics denoting the monitored speed of the articles; and means for influencing the speed of articles in said conduit as a function of the characteristics of said signals.

2. The apparatus of claim 1, wherein the rod-shaped articles are filter rod sections which are convertible into the mouthpieces of filter tipped smokers' products.

3. The apparatus of claim 1, wherein said accepting means comprises means for advancing successive articles of the file sideways away from said receiver.

4. The apparatus of claim 1, wherein said monitoring means is located at said receiver.

5. The apparatus of claim 1, wherein said influencing means is installed in said conduit between said article-receiving and article-discharging ends.

6. The apparatus of claim 1, wherein said influencing means is integrated into said conduit.

7. The apparatus of claim 1, wherein said influencing means is located at one of said article-receiving and article-discharging ends.

8. The apparatus of claim 1, wherein said speeds of said plurality of speeds include a predetermined maximum acceptable speed, said influencing means comprising means for introducing into said conduit a gaseous fluid which is effective to reduce the speed of articles when the monitored speed at least reaches said maximum acceptable speed.

9. The apparatus of claim 8, wherein said introducing means comprises at least one valve arranged to admit into said conduit a gaseous fluid which flows in a direction from said article-discharging end toward said article-receiving end.

10. The apparatus of claim 1, wherein said conduit defines an elongated path including an arcuate portion adjacent said article-discharging end, at least one of said monitoring and said influencing means being disposed at said arcuate portion of said path.

11. The apparatus of claim 10, wherein said at least one of said monitoring and said influencing means is located upstream of said arcuate portion as seen in the direction of conveying articles from said article-receiving end toward said article-discharging end.

12. The apparatus of claim 1, wherein said influencing means comprises a valve installed in said conduit and having a fluid outlet with an effective size which is variable in response to said signals.

13. The apparatus of claim 12, wherein said valve is an automatic vent valve.

14. The apparatus of claim 13, wherein said conduit defines an elongated fluid-containing path for successive articles of the file and is provided with a fluid discharging opening communicating with said outlet, said valve including means for varying the effective size of said outlet in response to said signals.

15. The apparatus of claim 14, wherein said means for varying the size of said outlet comprise a pneumatically operated cylinder-and-piston unit.

16. The apparatus of claim 1, further comprising means for braking successive articles of the file at said receiver.

17. The apparatus of claim 16, wherein said braking means comprises article-engaging rollers located ahead of said receiver, as seen in the direction of conveying articles from said sender to said receiver.

18. The apparatus of claim 16, further comprising means for accelerating successive braked articles to a predetermined speed ahead of said accepting means.

19. The apparatus of claim 18, wherein said monitoring means and said influencing means are located ahead of said braking and said accelerating means, as seen in the direction of conveying articles of the file from said sender to said receiver.

20. An apparatus for transporting a file of successive rod-shaped articles lengthwise from a sender to a receiver, comprising:

a pneumatic conduit for receiving the articles of the file, said pneumatic conduit having an article-receiving end at said sender and article-discharging end at said receiver;

means for advancing the articles of the file lengthwise through said pneumatic conduit from said sender to said receiver, said advancing means being able to move the articles of the file in a plurality of speeds;

means for accepting articles from said receiver;

means for monitoring the speed of the articles in said conduit and for generating signals having characteristics denoting the monitored speed of the articles; and means for influencing the speed of articles in said conduit as a function of the characteristics of said signals, said influencing means being located upstream of said monitoring means, as seen in a direction counter to the direction of conveying the articles from said article-receiving end toward said article-discharging end of said conduit.

* * * * *